(12) United States Patent
Behling et al.

(10) Patent No.: US 10,808,627 B2
(45) Date of Patent: Oct. 20, 2020

(54) DOUBLE BORE BASKET

(71) Applicant: United Technologies Corporation, Farmington, CT (US)

(72) Inventors: Weston Behling, Norwalk, CT (US); Andrew C. Carmack, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 264 days.

(21) Appl. No.: 15/936,147

(22) Filed: Mar. 26, 2018

(65) Prior Publication Data
US 2019/0292995 A1 Sep. 26, 2019

(51) Int. Cl.
*F01D 5/08* (2006.01)
*F02C 9/18* (2006.01)
(Continued)

(52) U.S. Cl.
CPC .............. *F02C 9/18* (2013.01); *F01D 5/081* (2013.01); *F01D 5/082* (2013.01); *F01D 5/084* (2013.01); *F01D 5/088* (2013.01); *F01D 11/24* (2013.01); *F01D 25/14* (2013.01); *F01D 25/24* (2013.01); *F02C 6/08* (2013.01); *F02C 7/18* (2013.01); *F01D 5/06* (2013.01); *F01D 5/066* (2013.01); *F05D 2220/3216* (2013.01); *F05D 2230/642* (2013.01); *F05D 2260/30* (2013.01);
(Continued)

(58) Field of Classification Search
CPC .......... F01D 5/081; F01D 5/082; F01D 5/084; F01D 5/088
See application file for complete search history.

(56) References Cited

U.S. PATENT DOCUMENTS 2,832,565 A * 4/1958 Thomas .................... F01D 5/06
416/198 R
3,428,243 A * 2/1969 Britt ......................... F01D 5/06
415/111
(Continued)

FOREIGN PATENT DOCUMENTS

EP          1820936       8/2007
EP          2910735       8/2015
(Continued)

OTHER PUBLICATIONS

European Patent Office, European Search Report dated Jun. 13, 2019 in Application No. 19153078.1.

*Primary Examiner* — Gerald L Sung
*Assistant Examiner* — Marc J Amar
(74) *Attorney, Agent, or Firm* — Snell & Wilmer LLP

(57) ABSTRACT

A compressor section or a turbine section of a gas turbine engine having an axis includes a drum. The compressor section or the turbine section also includes a plurality of bores extending radially inward from the drum including a first bore and a second bore. The compressor section or the turbine section also includes a first bore basket at least partially defining a first cavity such that the first bore has at least one surface located in the first cavity. The compressor section or the turbine section also includes a second bore basket at least partially defining a second cavity that is isolated from the first cavity such that the second bore has at least one surface located in the second cavity.

20 Claims, 3 Drawing Sheets

(51) Int. Cl.
*F01D 25/14* (2006.01)
*F01D 25/24* (2006.01)
*F02C 7/18* (2006.01)
*F02C 6/08* (2006.01)
*F01D 11/24* (2006.01)
*F01D 5/06* (2006.01)

(52) U.S. Cl.
CPC .. *F05D 2260/606* (2013.01); *F05D 2260/941* (2013.01); *F05D 2300/171* (2013.01); *F05D 2300/1723* (2013.01); *F05D 2300/50212* (2013.01)

(56) References Cited

U.S. PATENT DOCUMENTS

| | | | | |
|---|---|---|---|---|
| 3,647,313 | A * | 3/1972 | Koff | F01D 5/084 |
| | | | | 415/115 |
| 3,844,110 | A * | 10/1974 | Widlansky | F01D 25/125 |
| | | | | 60/39.08 |
| 5,271,711 | A * | 12/1993 | McGreehan | F01D 5/085 |
| | | | | 415/115 |
| 6,267,553 | B1 * | 7/2001 | Burge | F01D 5/06 |
| | | | | 415/115 |
| 6,334,755 | B1 * | 1/2002 | Coudray | F01D 5/088 |
| | | | | 415/115 |
| 9,234,463 | B2 * | 1/2016 | Benjamin | F02C 7/12 |
| 9,816,963 | B2 | 11/2017 | Vetters et al. | |
| 10,260,524 | B2 * | 4/2019 | Hiester | F04D 25/045 |
| 2002/0182059 | A1 * | 12/2002 | Escure | F01D 5/082 |
| | | | | 415/115 |
| 2008/0112793 | A1 * | 5/2008 | Lee | F01D 5/082 |
| | | | | 415/115 |
| 2015/0240723 | A1 * | 8/2015 | Gons | F01D 25/12 |
| | | | | 60/726 |
| 2017/0002834 | A1 * | 1/2017 | Powell | F04D 29/5826 |
| 2017/0184118 | A1 * | 6/2017 | Lueddecke | F01D 5/087 |

FOREIGN PATENT DOCUMENTS

| | | | | |
|---|---|---|---|---|
| EP | 2910735 | A1 * | 8/2015 | F01D 5/084 |
| EP | 2910736 | A1 * | 8/2015 | F01D 5/06 |
| FR | 2219312 | | 9/1974 | |
| FR | 2892148 | A1 * | 4/2007 | F01D 5/085 |
| GB | 707902 | A * | 4/1954 | F10D 5/06 |

* cited by examiner

DOUBLE BORE BASKET

GOVERNMENT LICENSE RIGHTS

This invention was made with Government support awarded by the United States. The Government has certain rights in this invention.

FIELD

The present disclosure relates generally to bore baskets for use with gas turbine engines.

BACKGROUND

Gas turbine engines typically include a compressor section, a combustor section and a turbine section. The compressor section may include a plurality of blades, each coupled to one of a plurality of bores. A drum may separate the blades from the bores, such that a core airflow may be compressed by the blades. As the compressor section increases in temperature, the blades may experience thermal expansion which facilitates a seal between the blades and an outer casing. The drum may reduce the likelihood of the compressed gas being received by the bores. In that regard, the bores may remain relatively cool and may resist radially outward expansion of the blades, reducing efficiency of the compressor section.

SUMMARY

Described herein is a compressor section or a turbine section of a gas turbine engine having an axis. The compressor section includes a drum. The compressor section or the turbine section also includes a plurality of bores extending radially inward from the drum including a first bore and a second bore. The compressor section or the turbine section also includes a first bore basket at least partially defining a first cavity such that the first bore has at least one surface located in the first cavity. The compressor section or the turbine section also includes a second bore basket at least partially defining a second cavity that is isolated from the first cavity such that the second bore has at least one surface located in the second cavity.

In any of the foregoing embodiments, the drum defines a first bleed port in fluid communication with the first cavity, and a second bleed port in fluid communication with the second cavity, the first bleed port and the second bleed port each configured to receive compressed gas from a core airflow of the compressor section or the turbine section.

In any of the foregoing embodiments, the first bore basket defines a fluid channel configured to receive the compressed gas from the first cavity via the first bleed port, and the drum further defines a fluid out port configured to receive the compressed gas from the fluid channel of the first bore basket and to output the compressed gas.

In any of the foregoing embodiments, the compressor section or the turbine section is the compressor section; the first bore includes a first material and the second bore includes a second material that has a greater resistance to heat than the first material; and the second bleed port is located downstream from the first bleed port such that the compressed gas received by the second bleed port has a greater temperature than the compressed gas received by the first bleed port.

In any of the foregoing embodiments, the first bore basket is coupled to the first bore; the second bore basket is coupled to the second bore; and a third cavity that is isolated from the first cavity and from the second cavity is at least partially defined between the first bore and the second bore.

In any of the foregoing embodiments, the first bore basket and the second bore basket each include at least one of a steel, a nickel, or a nickel alloy.

In any of the foregoing embodiments, the first bore basket has a forward end that is coupled to the drum and an aft end that is coupled to the first bore.

In any of the foregoing embodiments, the second bore basket is coupled to two bores of the plurality of bores.

In any of the foregoing embodiments, at least a third bore is located within the first cavity, and at least a fourth bore is located within the second cavity.

Any of the foregoing embodiments may also include a plurality of blades each located radially outward from one of the plurality of bores and configured to rotate about the axis, wherein the plurality of bores, the first bore basket, and the second bore basket are each configured to rotate with the plurality of blades.

Also disclosed is a compressor section or a turbine section of a gas turbine engine having an axis. The compressor section or the turbine section includes a drum. The compressor section or the turbine section also includes a plurality of bores extending radially inward from the drum including a first bore and a second bore. The compressor section or the turbine section also includes a first bore basket coupled to the first bore and at least partially defining a first cavity along with the first bore. The compressor section or the turbine section also includes a second bore basket coupled to the second bore and at least partially defining a second cavity along with the second bore, the second cavity being isolated from the first cavity.

In any of the foregoing embodiments, the drum defines a first bleed port in fluid communication with the first cavity, and a second bleed port in fluid communication with the second cavity, the first bleed port and the second bleed port each configured to receive compressed gas from a core airflow of the compressor section or the turbine section.

In any of the foregoing embodiments, the first bore basket defines a fluid channel configured to receive the compressed gas from the first cavity via the first bleed port, and the drum further defines a fluid out port configured to receive the compressed gas from the fluid channel of the first bore basket and to output the compressed gas.

In any of the foregoing embodiments, the compressor section or the turbine section is the compressor section; the first bore includes a first material and the second bore includes a second material that has a greater resistance to heat than the first material; and the second bleed port is located downstream from the first bleed port such that the compressed gas received by the second bleed port has a greater temperature than the compressed gas received by the first bleed port.

In any of the foregoing embodiments, the first bore basket is coupled to the first bore; the second bore basket is coupled to the second bore; and a third cavity that is isolated from the first cavity and from the second cavity is at least partially defined between the first bore and the second bore.

In any of the foregoing embodiments, the first bore basket and the second bore basket each include at least one of a steel, a nickel, or a nickel alloy.

In any of the foregoing embodiments, the first bore basket has a forward end that is coupled to the drum and an aft end that is coupled to the first bore, and the second bore basket is coupled to two bores of the plurality of bores.

Also disclosed is a high pressure compressor section of a gas turbine engine. The high pressure compressor section includes a drum. The high pressure compressor section also includes a plurality of bores extending radially inward from the drum including a first bore and a second bore. The high pressure compressor section also includes a first bore basket at least partially defining a first cavity such that the first bore has at least one surface located in the first cavity. The high pressure compressor section also includes a second bore basket at least partially defining a second cavity that is isolated from the first cavity such that the second bore has at least one surface located in the second cavity.

In any of the foregoing embodiments, the drum defines a first bleed port in fluid communication with the first cavity, and a second bleed port in fluid communication with the second cavity, the first bleed port and the second bleed port each configured to receive compressed gas from a core airflow of the high pressure compressor section.

In any of the foregoing embodiments, the first bore basket defines a fluid channel configured to receive the compressed gas from the first cavity via the first bleed port, and the drum further defines a fluid out port configured to receive the compressed gas from the fluid channel of the first bore basket and to output the compressed gas.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
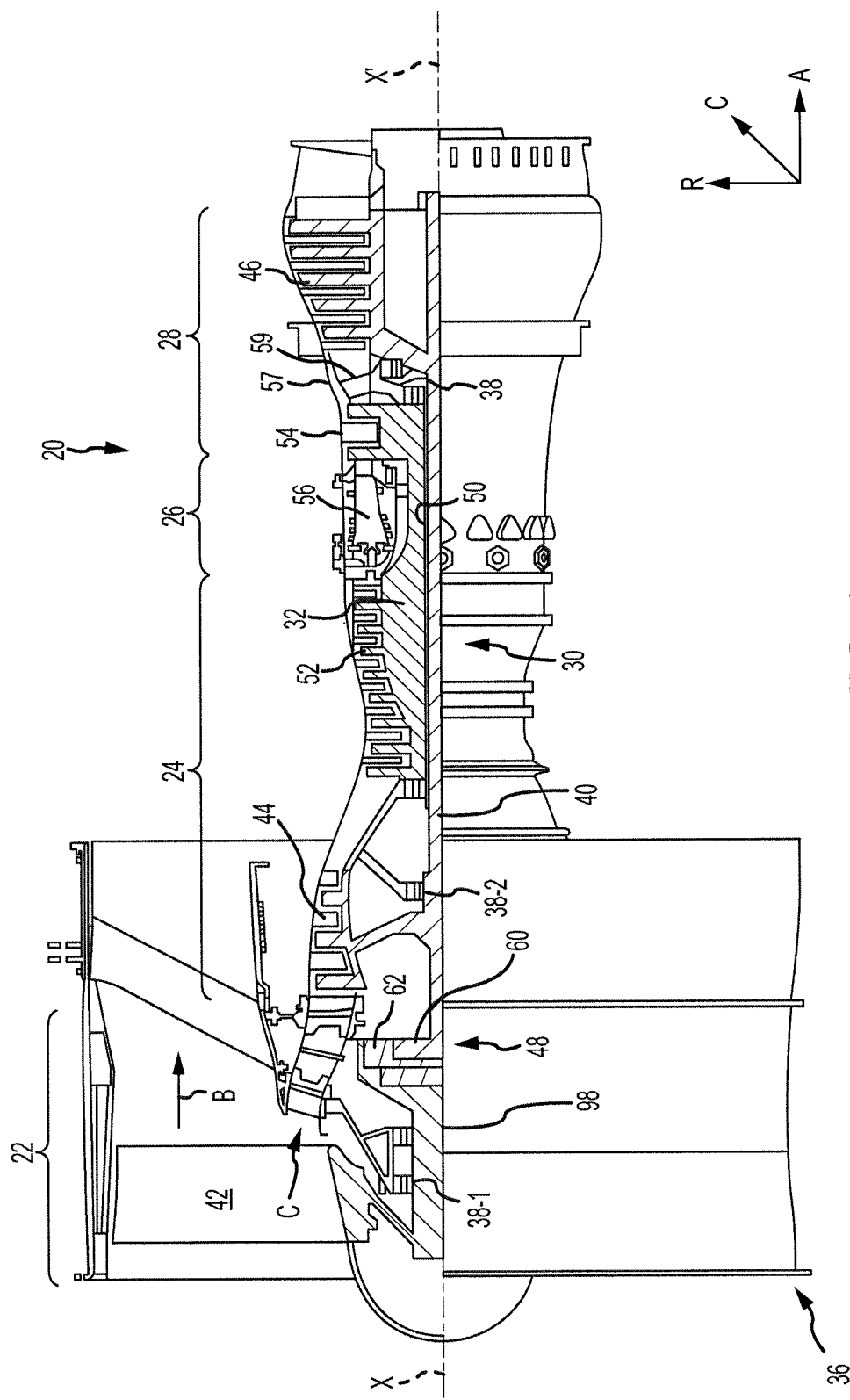
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. Alternative engines include an augmentor section among other systems or features. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
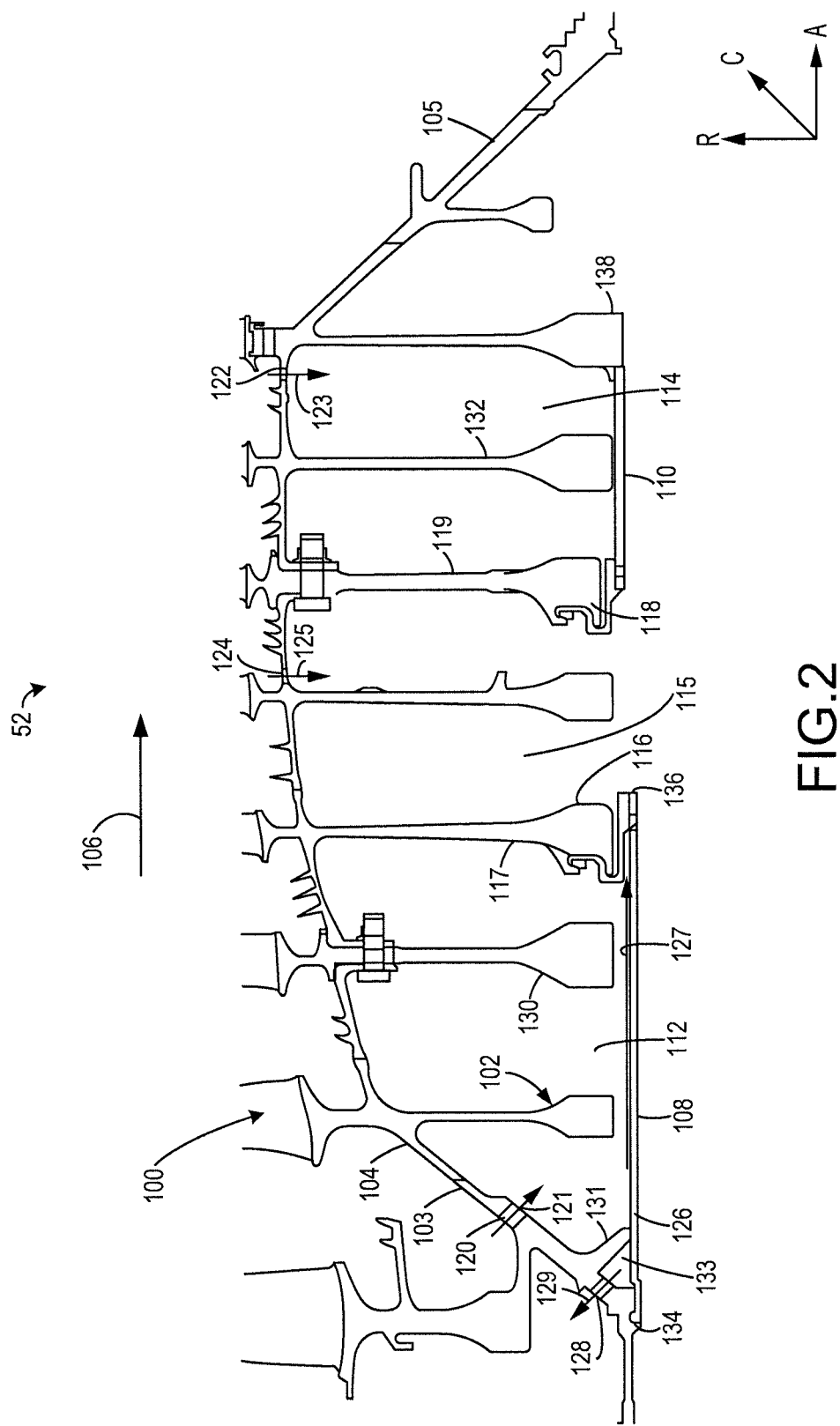
FIG. 2 is a cross-sectional view of a portion of a high pressure compressor section of the gas turbine engine of FIG. 1, in accordance with various embodiments.

Referring now to FIG. 2, additional details of the high pressure compressor section 52 are shown. In particular, the high pressure compressor section 52 includes a plurality of blades 100 each coupled to a plurality of bores 102. The high pressure compressor section 52 further includes a drum 104. The plurality of blades 100 may be located radially outward from the drum 104, and the plurality of bores 102 may be located radially inward from the drum 104.

The plurality of blades 100 may compress air along a core airflow, as illustrated by an arrow 106. The core airflow may be relatively hot, and the temperature may increase as the core airflow approaches an aft and of the high pressure compressor section 52.

Upon initialization of the high pressure compressor section 52, the core airflow may increase in temperature relatively quickly. This increase in temperature may create thermal expansion in each of the plurality of blades 100. However, because the plurality of bores 102 are separated from the plurality of blades 100 by the drum 104, the plurality of bores 102 may not experience the same temperature increase as the blades 100 and may thus resist radially outward expansion of the plurality of blades 100. In that regard, it may be desirable for the plurality of bores 102 to be exposed to relatively hot air (such as that from the core airflow) in order to allow the plurality of bores 102 to expand with the plurality of blades 100.

Because the core airflow may increase in temperature as it moves aft (it may increase as it moves aft in compressor sections, and may decrease as it moves aft in turbine sections), two or more of the plurality of bores 102 may include a different material. For example, a first bore 116 and a third bore 130 may include a first material (e.g., titanium), and a second bore 118 and a fourth bore 132 may include a second material (e.g., a nickel or a nickel alloy). Because the second bore 118 and the fourth bore 132 are located axially aft of the first bore 116 and the third bore 130, the second material may have a greater heat resistance than the first material. That is, the second material may be less likely to become damaged in response to exposure to heat than the first material. In that regard, it may be desirable for two or more of the plurality of bores 102 to be exposed to air of different temperatures. For example, it may be desirable for the first bore 116 and the third bore 130 to be exposed to air of a first temperature, and for the second bore 118 and the fourth bore 132 to be exposed to air of a second temperature that is greater than the first temperature.

In that regard, the high pressure compressor section 52 may include a first bore basket 108 and a second bore basket 110. The first bore basket 108 may include a forward end 134 that is coupled to the drum 104 (such as a forward end 103 of the drum 104), and may include an aft end 136 that is coupled to the first bore 116. The first bore basket 108 may at least partially define a first cavity 112. A surface 117 of the first bore 116 may be located within the first cavity 112, and the third bore 130 may be entirely located within the first cavity 112. The first cavity 112 may be defined between the drum 104, the surface 117, and the first bore basket 108.

The second bore basket 110 may be coupled between two bores of the plurality of bores 102. In particular, the second bore basket 110 may be coupled to the second bore 118 and a fifth bore 138. In various embodiments, the second bore basket 110 may extend to an aft end 105 of the drum 104. The second bore basket 110 may define a second cavity 114 along with the second bore 118, the fifth bore 138, and to the drum 104. A surface 119 of the second bore 118 may be located in the second cavity 114. The fourth bore 132 may be located entirely within the second cavity 114.

The bore baskets 108, 110 may be coupled to the drum 104 and one or more of the plurality of bores 102 via screw threading, welding, clips, support rings, or the like.

A third cavity 115 may be defined between the first bore 116 and the second bore 118. The first bore basket 108 may cause the first cavity 112 to remain isolated relative to the second cavity 114 and the third cavity 115. Stated differently, the first bore basket 108 may reduce the likelihood of the fluid flowing from the first cavity 112 to either of the second cavity 114 or the third cavity 115. Similarly, the second bore basket 110 may cause the second cavity 114 to remain isolated relative to the first cavity 112 and the third cavity 115.

The first cavity 112 may receive compressed gas from the core airflow via a first bleed port 120 as shown by an arrow 121. The compressed gas may allow the first bore 116 and the third bore 130 to increase in heat to allow thermal expansion to match that of the corresponding blades 100. The second cavity 114 may receive compressed gas from the core airflow via a second bleed port 122 as shown by an arrow 123. The third cavity 115 may receive compressed gas from the core airflow via a third bleed port 124 as shown by an arrow 125.

The third bleed port 124 may be located downstream from the first bleed port 120 and may receive compressed gas having a temperature that is greater than the compressed gas received by the first bleed port 120. Similarly, the second bleed port 122 may be located downstream from the third bleed port 124 and may receive compressed gas having a temperature that is greater than the compressed gas received by the third bleed port 124. In that regard, each of the plurality of bores 102 may receive compressed gas having a temperature that is similar to the temperature of the compressed gas experienced by the corresponding blade of the plurality of blades 100.

The first bore basket 108 may define a fluid channel 126. The fluid channel 126 may receive the compressed gas from the first cavity 112, as shown by an arrow 127. The compressed gas may flow through the fluid channel 126 and return to the core airflow via a fluid out port 128, as shown by an arrow 129. In that regard, the drum 104 may include a flange 131 that defines a fluid out cavity 133 (along with the first bore basket 108) through which the compressed gas may flow upon exiting the fluid channel 126 and before flowing out the fluid out port 128. Because pressure is greater at the first bleed port 120 than the fluid out port 128, the compressed gas may be forced along this path and out the fluid out port 128.

Figure 3:
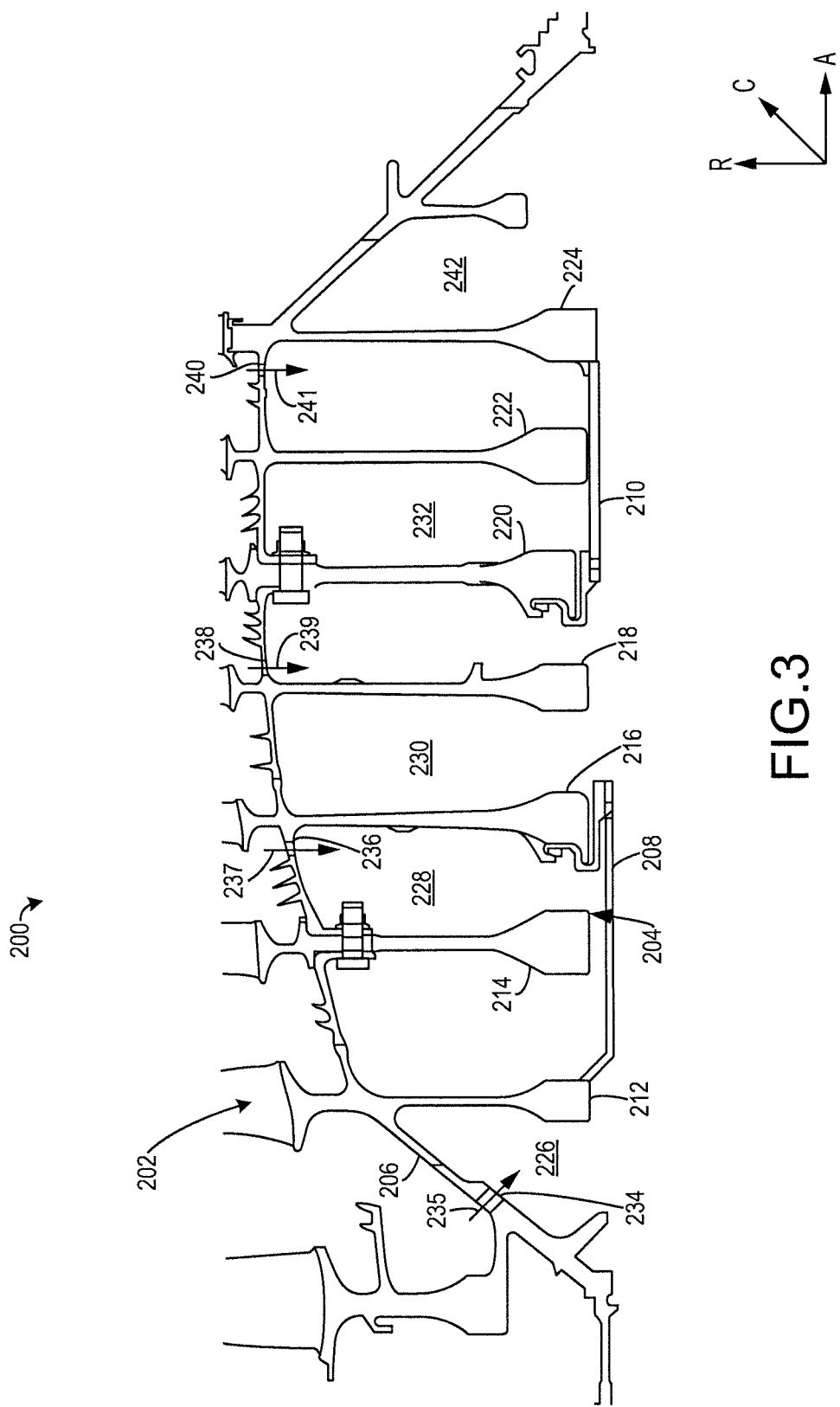
FIG. 3 is a cross-sectional view of a portion of a high pressure compressor section of a gas turbine engine, in accordance with various embodiments.

Referring now to FIG. 3, another high pressure compressor section 200 is shown. The high pressure compressor section 200 includes a plurality of blades 202 and a corresponding plurality of bores 204, along with a drum 206. The high pressure compressor section 200 may include a first bore basket 208 and a second bore basket 210.

The first bore basket 208 may be coupled to a first bore 212 and a third bore 216. The second bore basket 210 may be coupled to a fifth bore 220 and a seventh bore 224. In that regard, a first cavity 226 may be defined between the first bore 212 and the drum 206. The first cavity 226 may receive compressed gas via a first bleed port 234 as shown by an arrow 235.

A second cavity 228 may be defined between the first bore 212, the third bore 216, and the first bore basket 208. A second bore 214 may be located within the second cavity 228. The second cavity 228 may receive compressed gas from the core airflow via a second bleed port 236, as shown by an arrow 237.

A third cavity 230 may be defined between the third bore 216 and the fifth bore 220. A fourth bore 218 may be located within the third cavity 230. The third cavity 230 may receive compressed gas from the core airflow via a third bleed port 238, as shown by an arrow 239.

A fourth cavity 232 may be defined between the fifth bore 220 and the seventh bore 224. A sixth bore 222 may be located in the fourth cavity 232. The fourth cavity 232 may receive compressed gas from the core airflow via a fourth bleed port 240, as shown by an arrow 241. In that regard, two bore baskets may be included in the high pressure compressor section 200 to create two cavities, three cavities, four cavities, or even five cavities (such as a fifth cavity at a location 242).

Although the disclosure has been described with reference to a high pressure compressor section, one skilled in the art will realize that similar bore baskets may be utilized in any of a low pressure compressor section, a high pressure compressor section, a low pressure turbine section, or a high pressure turbine section of a gas turbine engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A compressor section or a turbine section of a gas turbine engine having an axis, comprising:
   a drum;
   a plurality of bores extending radially inward from the drum including a first bore and a second bore;
   a first bleed port configured to port a first portion of a core airflow into a first cavity and a second bleed port located downstream from the first bleed port and configured to port a second portion of the core airflow into a second cavity;
   a first bore basket having a first upstream end and a first downstream end located downstream from the first upstream end, the first bore basket at least partially defining the first cavity such that the first bore has at least one surface located in the first cavity and is configured to be exposed to the first portion of the core airflow; and a second bore basket having a second upstream end located downstream from the first downstream end and a second downstream end located downstream from the second upstream end, the second bore basket at least partially defining the second cavity that is isolated from the first cavity such that the second bore has at least one surface located in the second cavity and is configured to be exposed to the second portion of the core airflow.

2. The compressor section or the turbine section of claim 1, wherein the drum defines the first bleed port in fluid communication with the first cavity, and the second bleed port in fluid communication with the second cavity, the first bleed port and the second bleed port each configured to receive compressed gas from the core airflow of the compressor section or the turbine section.

3. The compressor section or the turbine section of claim 2, wherein the first bore basket defines a fluid channel configured to receive the compressed gas from the first cavity via the first bleed port, and the drum further defines a fluid out port configured to receive the compressed gas from the fluid channel of the first bore basket and to output the compressed gas.

4. The compressor section or the turbine section of claim 2, wherein:

the compressor section or the turbine section is the compressor section;

the first bore includes a first material and the second bore includes a second material that has a greater resistance to heat than the first material; and the second bleed port is located downstream from the first bleed port such that the compressed gas received by the second bleed port has a greater temperature than the compressed gas received by the first bleed port.

5. The compressor section or the turbine section of claim 1, wherein:

the first bore basket is coupled to the first bore;

the second bore basket is coupled to the second bore; and a third cavity that is isolated from the first cavity and from the second cavity is at least partially defined between the first bore and the second bore.

6. The compressor section or the turbine section of claim 1, wherein the first bore basket and the second bore basket each include at least one of a steel, a nickel, or a nickel alloy.

7. The compressor section or the turbine section of claim 1, wherein the first bore basket has a forward end that is coupled to the drum and an aft end that is coupled to the first bore.

8. The compressor section or the turbine section of claim 7, wherein the second bore basket is coupled to two bores of the plurality of bores.

9. The compressor section or the turbine section of claim 1, wherein at least a third bore is located within the first cavity, and at least a fourth bore is located within the second cavity.

10. The compressor section or the turbine section of claim 1, further comprising a plurality of blades each located radially outward from one of the plurality of bores and configured to rotate about the axis, wherein the plurality of bores, the first bore basket, and the second bore basket are each configured to rotate with the plurality of blades.

11. A compressor section or a turbine section of a gas turbine engine having an axis, comprising:

a drum;

a plurality of bores extending radially inward from the drum including a first bore and a second bore;

a first bleed port configured to port a first portion of a core airflow into a first cavity and a second bleed port located downstream from the first bleed port and configured to port a second portion of the core airflow into a second cavity;

a first bore basket having a first upstream end and a first downstream end located downstream from the first upstream end, the first bore basket coupled to the first bore and at least partially defining the first cavity along with the first bore such that the first bore has at least one surface located in the first cavity and is configured to be exposed to the first portion of the core airflow; and a second bore basket having a second upstream end located downstream from the first downstream end and a second downstream end located downstream from the second upstream end, the second bore basket coupled to the second bore and at least partially defining the second cavity along with the second bore, the second cavity being isolated from the first cavity such that the second bore has at least one surface located in the second cavity and is configured to be exposed to the second portion of the core airflow.

12. The compressor section or the turbine section of claim 1, wherein the drum defines the first bleed port in fluid communication with the first cavity, and the second bleed port in fluid communication with the second cavity, the first bleed port and the second bleed port each configured to receive compressed gas from the core airflow of the compressor section or the turbine section.

13. The compressor section or the turbine section of claim 12, wherein the first bore basket defines a fluid channel configured to receive the compressed gas from the first cavity via the first bleed port, and the drum further defines a fluid out port configured to receive the compressed gas from the fluid channel of the first bore basket and to output the compressed gas.

14. The compressor section or the turbine section of claim 12, wherein:

the compressor section or the turbine section is the compressor section;

the first bore includes a first material and the second bore includes a second material that has a greater resistance to heat than the first material; and the second bleed port is located downstream from the first bleed port such that the compressed gas received by the second bleed port has a greater temperature than the compressed gas received by the first bleed port.

15. The compressor section or the turbine section of claim 11, wherein:

the first bore basket is coupled to the first bore;

the second bore basket is coupled to the second bore; and a third cavity that is isolated from the first cavity and from the second cavity is at least partially defined between the first bore and the second bore.

16. The compressor section or the turbine section of claim 11, wherein the first bore basket and the second bore basket each include at least one of a steel, a nickel, or a nickel alloy.

17. The compressor section or the turbine section of claim 1, wherein the first bore basket has a forward end that is coupled to the drum and an aft end that is coupled to the first bore, and the second bore basket is coupled to two bores of the plurality of bores.

18. A high pressure compressor section of a gas turbine engine, comprising:
a drum;
a plurality of bores extending radially inward from the drum including a first bore and a second bore;
a first bleed port configured to port a first portion of a core airflow into a first cavity and a second bleed port located downstream from the first bleed port and configured to port a second portion of the core airflow into a second cavity;
a first bore basket having a first upstream end and a first downstream end located downstream from the first upstream end, the first bore basket at least partially defining the first cavity such that the first bore has at least one surface located in the first cavity and is configured to be exposed to the first portion of the core airflow; and
a second bore basket having a second upstream end located downstream from the first downstream end and a second downstream end located downstream from the second upstream end, the second bore basket at least partially defining the second cavity that is isolated from the first cavity such that the second bore has at least one surface located in the second cavity and is configured to be exposed to the second portion of the core airflow.

19. The high pressure compressor section of claim 18, wherein the drum defines the first bleed port in fluid communication with the first cavity, and the second bleed port in fluid communication with the second cavity, the first bleed port and the second bleed port each configured to receive compressed gas from the core airflow of the high pressure compressor section.

20. The high pressure compressor section of claim 19, wherein the first bore basket defines a fluid channel configured to receive the compressed gas from the first cavity via the first bleed port, and the drum further defines a fluid out port configured to receive the compressed gas from the fluid channel of the first bore basket and to output the compressed gas.

* * * * *